United States Patent
Kao et al.

(10) Patent No.: US 9,706,335 B2
(45) Date of Patent: Jul. 11, 2017

(54) CELLULAR DEVICES AND PAIRING SERVER IMPLEMENTING A PAIRING METHOD

(71) Applicant: AthenTek Inc., Taipei (TW)

(72) Inventors: Haojen Kao, Taipei (TW); Chiu Ting Liao, Taoyuan County (TW)

(73) Assignee: AthenTek Incorporated, Taipei (TW)

( * ) Notice: Subject to any disclaimer, the term of this patent is extended or adjusted under 35 U.S.C. 154(b) by 276 days.

(21) Appl. No.: 14/469,461

(22) Filed: Aug. 26, 2014

(65) Prior Publication Data

US 2016/0066122 A1   Mar. 3, 2016

(51) Int. Cl.
  *H04W 4/00*  (2009.01)
  *H04W 76/02*  (2009.01)
(52) U.S. Cl.
  CPC ......... *H04W 4/005* (2013.01); *H04W 76/023* (2013.01)
(58) Field of Classification Search
  CPC .......................... H04W 4/005; H04W 76/023
  USPC ............. 455/41.2, 418–420, 435.1, 558
  See application file for complete search history.

(56) References Cited

U.S. PATENT DOCUMENTS

| | | | |
|---|---|---|---|
| 2006/0087999 A1* | 4/2006 | Gustave | H04L 63/0853 370/328 |
| 2009/0247197 A1* | 10/2009 | Graff et al. | H04L 29/12122 455/466 |
| 2012/0108230 A1* | 5/2012 | Stepanian | G06F 21/10 455/422.1 |
| 2013/0324169 A1* | 12/2013 | Kamal | H04W 4/008 455/466 |
| 2014/0220951 A1* | 8/2014 | Gumbrell | H04W 4/005 455/418 |
| 2014/0235168 A1* | 8/2014 | Molettiere et al. | H04B 7/26 455/41.2 |
| 2015/0089222 A1* | 3/2015 | White et al. | H04L 63/0428 713/168 |
| 2015/0163843 A1* | 6/2015 | Zhu et al. | H04L 63/0869 455/41.2 |
| 2016/0240062 A1* | 8/2016 | Ritala et al. | G08B 21/023 |

* cited by examiner

*Primary Examiner* — Michael Mapa

(57) ABSTRACT

Cellular devices and a pairing server implementing a Pairing method are described. The first cellular device includes a first subscriber identity module (SIM) card, a controller and a transceiver. The first SIM card is configured to store a first international mobile subscriber identity (IMSI). The controller is configured to receive a pairing command. The transceiver is configured to transmit the first IMSI without a Mobile Subscriber Integrated Services Digital Network-Number (MSISDN) in response to the pairing command.

7 Claims, 4 Drawing Sheets

CELLULAR DEVICES AND PAIRING SERVER IMPLEMENTING A PAIRING METHOD

BACKGROUND OF THE INVENTION

Field of the Invention

The present invention relates to cellular communication, and in particular relates to a cellular device and a pairing server implementing a pairing method.

Description of the Related Art

Presently, cellular phones and cellular devices typically employ a subscriber identity module (SIM) which contains identifier information such as an internal mobile subscriber identity (IMSI) and Mobile Subscriber Integrated Services Digital Network-Number (MSISDN), wherein the IMSI identifies the SIM and the MSISDN identifies a network subscriber and serves as a telephone number. In addition to the SIM, the cellular phones and devices also contain memory devices which store internal mobile equipment identity (IMEI) for identifying the devices.

In a conventional network pairing application, two cellular devices are paired together by the MSISDNs, so that one of the paired cellular devices can monitor the activities of the other paired cellular device through one or more communication networks. However, as the number of the available MSISDNs is limited and may become insufficient for a growing number of pairing applications such as location-based applications and home-automation applications, there is an increasing desire to develop a pairing method which pairs two cellular devices by a means other than the MSISDNs.

BRIEF SUMMARY OF THE INVENTION

A detailed description is given in the following embodiments with reference to the accompanying drawings.

An embodiment of a first cellular device is described, comprising a first subscriber identity module (SIM) card, a controller, and a transceiver. The first SIM card is configured to store a first international mobile subscriber identity (IMSI). The controller is configured to receive a pairing command. The transceiver is configured to transmit the first IMSI without a Mobile Subscriber Integrated Services Digital Network-Number (MSISDN) in response to the pairing command.

Another embodiment of a first cellular device is provided, comprising a second SIM card and a transceiver. The second SIM card is configured to store a second device identifier. The second transceiver is configured to receive a first IMSI on a first SIM card from the first cellular device, and transmit a pairing request including only the first IMSI and the second device identifier to a pairing server.

An embodiment of a pairing server is disclosed, pairing a first cellular device with a second cellular device, comprising an Input/output (IO) interface and a controller. The IO interface is configured to receive a second device identifier of the second cellular device and a first IMSI of the first cellular device. After receiving the second device identifier of the second cellular device and a first IMSI of the first cellular device, the controller is configured to associate the first cellular device with the second cellular device.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
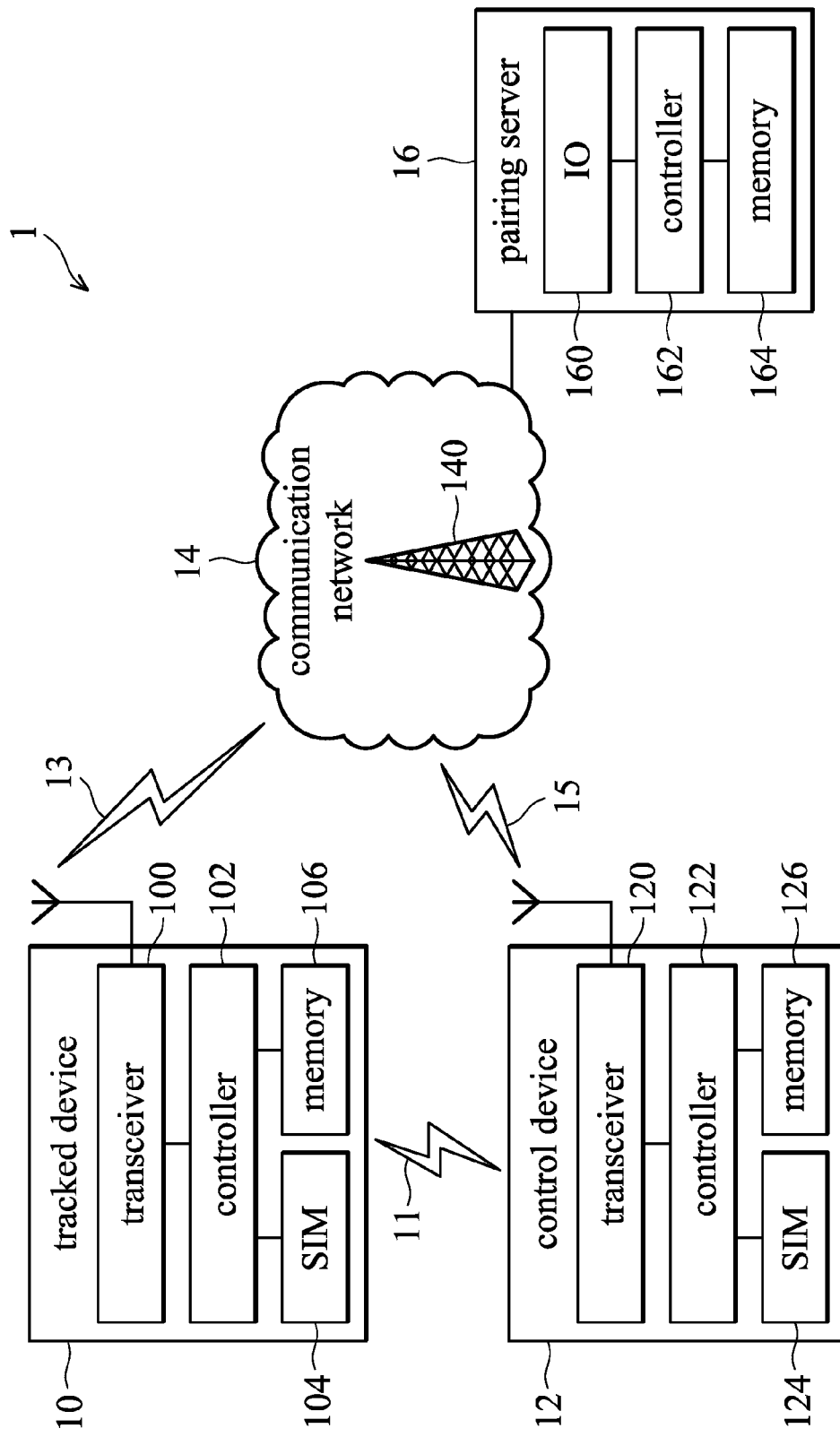
FIG. 1 is a circuit schematic of a class A/AB amplifier 1 according to an embodiment of the invention.

FIG. 1 is a block diagram of a pairing system 1 according to an embodiment of the invention, including a tracked device 10 (first cellular device), a control device 12 (second cellular device), a communication network 14 and a pairing server 16. The pairing system 1 is used to track and trace the movements or activities of the tracked device 10 and supply the tracking data to the control device 12 for further processing and action.

The pairing system 1 finds uses in variety of different applications. For example, in a location-based service such as identifying the location of the tracked device 10, the tracked device 10 and the control device 12 are associated by the pairing server 16, the position of the tracked device 10 are located and tracked by a network server over time using a positioning technology such as the global positioning system (GPS), and tracking data are provided to the control device 12 (such as a smartphone) to depict the motion of the tracked device 10 (such as a vehicle, an equipment, or a person who carries a GPS tracking unit) on a display panel.

In another example of a home-automation application (such as remotely controlling a home appliance), after the tracked device 10 and the control device 12 are associated by the pairing server 16, the control device 12 (such as a mobile phone) may monitor the statuses and control the features of the tracked device 10 (such as a smart home appliance) through the communication network 14. Regardless of whether location-based services or home-automation applications are being used, the tracked device 10 and the control device 12 must be paired for the control device 12 to receive data or information about the tracked device 10 and for the control device 12 to perform further operations.

Unlike conventional pairing methods, in which the tracked device and the control device are paired by Mobile Subscriber Integrated Services Digital Network-Numbers (MSISDN), the tracked device 10 and the control device 12 in the embodiments are associated together by International Mobile Subscriber Identities (IMSI) and/or International Mobile Equipment Identities (IMEI). An IMSI is a 64-bit data field uniquely identifying a Subscriber Identity Module (SIM) card and which is stored in a SIM card on a mobile phone. An IMEI is a number uniquely identifying a hardware device such as a mobile phone, typically stored in a memory of the hardware device. An MSISDN is a number identifying a subscription in a communication network such as a Global System for Mobile Communications (GSM) or a Universal Mobile Telecommunications System (UMTS) network, often stored in a SIM card of a mobile phone and serving as the telephone number. As the number of mobile phone users increases, there are an insufficient number of available MSISDNs for all applications. The embodiments of the invention deal with this issue by employing the IMSI and/or the IMEI of the tracked device 10 in a pairing method, so that service providers are not required to assign a MSISDN to the tracked device 10. In one example, the pairing server 16 may associate a first IMEI in a SIM card SIM1 with a first IMEI in a mobile phone MS1 in the pairing method. After the association, the mobile phone MS1 may track and trace the location of any cellular device on which the SIM card SIM1 is installed.

The control device 12 may be a smartphone, tablet computer, laptop computer, handheld computer, or any cellular device which may be configured for wireless communication, or any combination thereof. The control device 12 includes a transceiver 120 (second transceiver), a controller 122 (second controller), a second Subscriber Identity Module (SIM) card 124 and a memory 126 (second memory) to associate with the tracked device 10 and monitor the activities of the tracked device 10. The second SIM 124 stores a second International Mobile Subscriber Identity (IMSI) and a secret key together with other subscriber-specific information such as preferences, settings, and personal phone books. The second SIM 124 may further contain a second MSISDN of the control device 12. The memory 126 includes random-access memory (RAM) which stores a second pairing application and data such as a second International Mobile Equipment Identity (IMEI) for the pairing method. The second pairing application implements the operations of the control device 12 in pairing methods 2 or 3 in FIGS. 2 and 3 to associate with the tracked device 10. The controller 122 directs operations of the transceiver 120, the second SIM card 124 and the memory 126. Moreover, the controller 122 loads and executes the second pairing application in the memory 126 to perform relevant tasks. The transceiver 120 allows transmission and reception of data including the second IMSI and second IMEI to a remote location, such as a base station 140 in the communication network 14, or the tracked device 10. An antenna is electrically coupled to the transceiver 120 for transmitting and receiving the data via a wireless connection.

The second pairing application in the memory 126 may include an input interface for a user to enter a pairing command. Upon receiving the pairing command, the transceiver 120 can send a pairing request message containing a second device identifier of the control device 12 to the pairing server 16. The second device identifier may be the second IMEI, second IMSI, or second MSISDN of the control device 12. In some embodiments, the transceiver 120 may receive a first IMSI from the tracked device 10 and transmit the pairing request message containing the second device identifier such as the second IMEI of the control device 12 and the first IMSI of the tracked device 10 to the pairing server 16. In any case, the pairing request message does not contain an MSISDN of the tracked device 10.

The tracked device 10 may be a vehicle, equipment, asset, or person who carries a GPS tracking unit. The tracked device 10 includes a transceiver 100 (first transceiver), a controller 102 (first controller), a second SIM card 104, and a memory 106 (first memory). The memory 106 includes RAM which stores a first pairing application and data such as a first IMEI for the pairing method. The first pairing application implements the operations of the tracked device 10 in pairing methods 2 or 3 in FIGS. 2 and 3 to associate with the control device 12. The SIM 104 stores a first IMSI, a secret key together with other subscriber-specific information such as preferences, settings, and personal phone books. All components and devices in the tracked device 10 contain no MSISDN of the control device 12. The controller 102 directs operations of the transceiver 120, the controller 122, the second SIM card 124 and the memory 126. Moreover, the controller 122 loads and executes the second pairing application in the memory 126 to perform relevant tasks. The tracked device 10 can adopt the pairing methods 2 or 3 in FIGS. 2 and 3 to associate with the control device 12. The controller 102 directs operations of the transceiver 100, the first SIM card 104 and the memory 106. Moreover, the controller 102 loads and executes the first pairing application in the memory 106 to perform relevant tasks described in the paring method 2 or 3 in FIGS. 2 and 3. The transceiver 100 allows transmission and reception of data including the first IMSI and first IMEI to a remote location, such as the base station 140 in the communication network 14, or the control device 12. An antenna is electrically coupled to the transceiver 100 for transmitting and receiving the data via a wireless connection.

The first pairing application in the memory 106 may include an input interface for a user to enter a pairing command. Upon receiving the pairing command, the transceiver 100 can send a pairing registration message containing the first IMSI and/or first IMEI to a remote device such as the control device 12 or the pairing server 16 through the communication network 14. In some embodiments, the transceiver 100 may send the pairing registration message which contains simply the first IMEI of the tracked device 10 to the control device 12. In any case, the pairing registration message does not contain an MSISDN of the tracked device 10.

The communication network 14 may be a public switch telephone network (PSTN), integrated services digital network (ISDN), public land mobile network (PLMN), circuit switched public data network (CSPDN), packet switched public data network (PSPDN), power distribution network, or a combination thereof.

The pairing server 16 includes an input/output (IO) interface 160, a controller 162, and a memory 164. The IO interface 160 transmits data to and receives data from a remote device such as the tracked device 10 or the control device 12. The data may be IMSI and/or IMEI of the tracked device 10 and the control device 12. The memory 106 includes RAM which stores a third pairing application and data for the pairing method. The pairing server 16 can adopt the pairing methods 2 or 3 in FIGS. 2 and 3 to associate the control device 12 with the tracked device 10. The controller 162 loads and executes the third pairing application stored in the memory 164, although in some embodiments a separate dedicated processor may be used to implement the pairing method.

The IO interface 160 can receive the second device identifier of the control device 12 and the first IMSI of the tracked device 10 in various communication messages. In one example, the IO interface 160 may receive a pairing request message including the second device identifier of the control device 12 and the IMSI of the tracked device 10 from the control device 12 and a pairing registration message including only the IMSI of the tracked device 10 from the tracked device 10. In another example, the IO interface 160 may only receive a pairing request message including the second device identifier of the control device 12 and the IMSI of the tracked device 10 from the control device 12.

When launching the third pairing application on the controller 162, the controller 162 can regularly and constantly monitor for the pairing request message from the control device 12 and/or the pairing registration message from the tracked device 10. When the pairing request message is received, the controller 162 can determine the content thereof. After receiving the pairing request message which contains the second device identifier of the control device 12 and the IMSI of the tracked device 10, the controller 162 may monitor for the presence of the pairing registration message which contains the IMSI of the tracked device 10. When the pairing registration message is received, the controller 162 can check the validity of the pairing request by determining whether the received messages contain correct information and whether the first IMSIs in the pairing request message and the pairing registration message match each other. Only when both the pairing request message and pairing registration message contain the matched IMSIs of the tracked device 10, can the controller 162 associate or pair the control device 12 and the tracked device 10 together by associating the second device identifier of the control device 12 and the IMSI of the tracked device 10. The control device 12 may store the association of the control device 12 and the tracked device 10 in a pairing database in the memory 164.

In another implementation, the pairing request message from the control device 12 contains the second device identifier of the control device 12 and the IMSI of the tracked device 10. The controller 162 can associate or pair the control device 12 and the tracked device 10 together by associating the second device identifier of the control device 12 and the IMSI of the tracked device 10. The control device 12 may store the association of the control device 12 and the tracked device 10 in a pairing database in the memory 164.

The pairing server 16, the control device 12, the tracked device 10, and the communication network 14 may comprise other components, such as power supplies (not shown), input/output devices (not shown), and additional CPUs and buses. These components can be arranged in various configurations. The system and method described herein are not limited to the specific configuration and arrangement of components shown.

The pairing system 1 allows the control device 12 and the tracked device 10 to be associated together by the IMSIs and/or IMEIs, preventing the MSISDNs from being used in a pairing procedure, while providing the pairing feature to the control device 12 and the tracked device 10.

Figure 2:
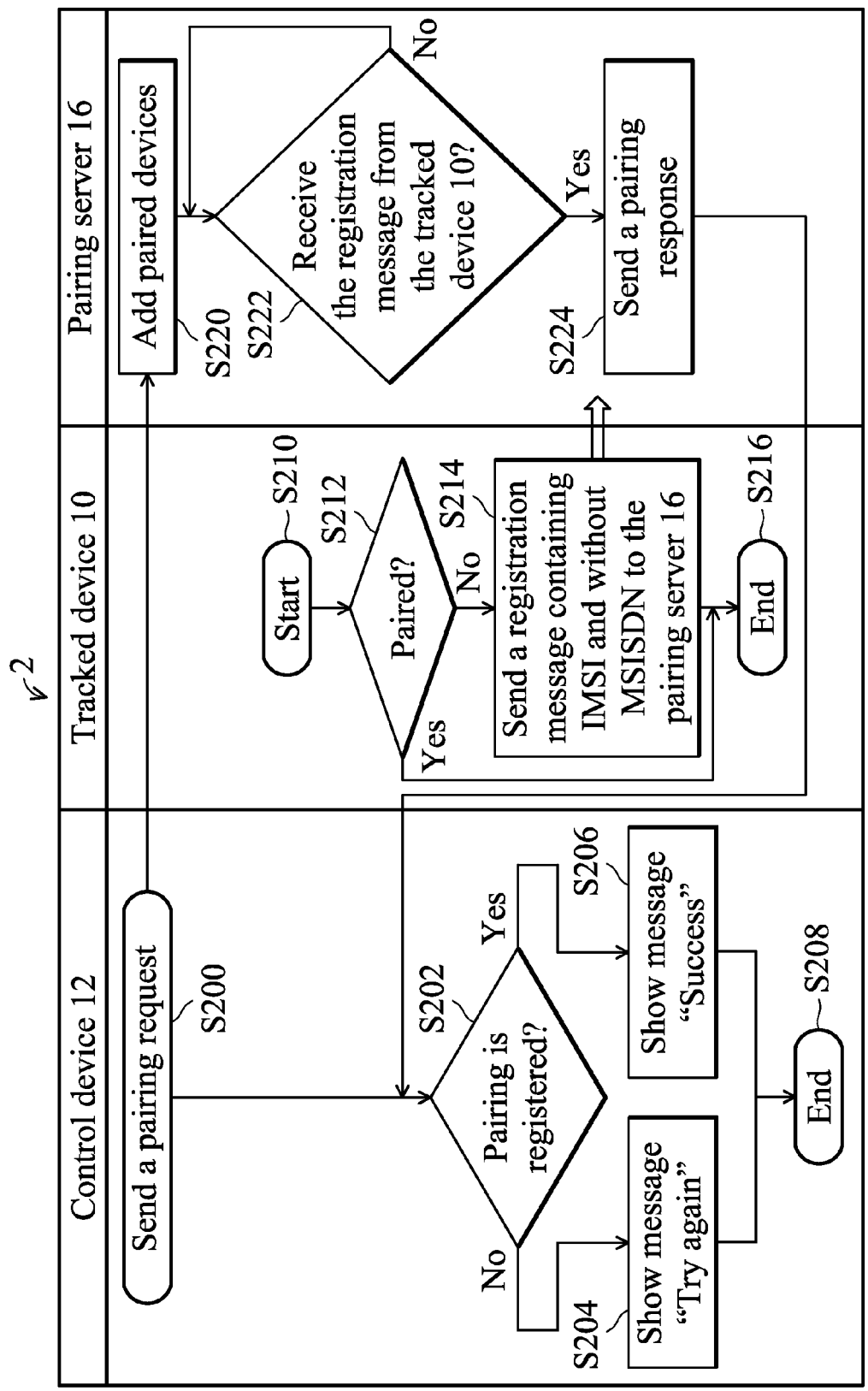
FIG. 2 is a flowchart of a pairing method 2 according to an embodiment of the invention.

FIG. 2 is a flowchart of a pairing method 2 according to an embodiment of the invention, incorporating the pairing system 1 in FIG. 1. The pairing method 2 may be implemented by program code executable by a controller, hardware circuits in a controller, or a combination thereof. The program code may be stored in a memory coupled to the controller. The pairing method 2 may be initiated before a location-based service, a home-automation service or a smart grid service.

Upon startup of the pairing method 2, the controller 122 of the control device 12 loads a first pairing application associated with the pairing method 2. The first pairing application may include an input interface to receive a pairing command entered by a user. The control device 12 can determine whether a pairing command has been entered into the input interface (S200). If not, the pairing method 2 goes back to Step S200 to carry on monitoring a pairing command input. Upon receiving a pairing command, a pairing request message can be sent by the transceiver 120 of the control device 12 to the pairing server 16 via the communication network 14 (S201). Prior to sending the pairing request message, the control device 12 may have received the IMSI and/or IMEI information from the tracked device 10 by scanning a machine-readable label such as a QR code displayed on the tracked device 10, by wireless transmissions such as Bluetooth or Infrared, or by wired transmissions such as a USB cable. The pairing request message includes the IMSI and/or IMEI of the control device 12 and the tracked device 10 and not the MSISDN. The pairing request message may be transmitted through a wired connection, a wireless connection, or a combination thereof.

Once the pairing request is received by the IO interface 160 of the pairing server 16, the controller 162 of the pairing server 16 can initiate an add-paired-device procedure (S220) and wait for a subsequent message from the tracked device 10.

Meanwhile, the controller 102 of the tracked device 10 also loads a second pairing application. A pairing command may be entered by a user into the tracked device 10 via the second pairing application. In response to the pairing command, the controller 102 can determine whether the tracked device 10 is paired or associated with another cellular device (S212) after the tracked device 10 is powered on or the second pairing application is initiated (S210). If the tracked device 10 has already paired or associated with another cellular device, the second pairing application may go to Step S216 and exit. If the tracked device 10 has not yet paired or associated with another cellular device, a pairing registration message can be transmitted by the transceiver 100 of the tracked device 10 to the pairing server 16 via the communication network 14 (S214). The pairing registration message includes the IMSI and/or IMEI and not the MSISDN of the tracked device 10. The pairing registration message may be transmitted through a wired connection, a wireless connection, or a combination thereof. After the pairing registration is successful, the second pairing application may be completed and exited (S216). The controller 102 may determine that the pairing registration is successful by receiving a pairing response message from the pairing server 16 (not shown), wherein the pairing response message indicates a result of the add-paired-device procedure being a success or failure. When the add-paired-device procedure is successful, the second pairing application may configure a flag to indicate the tracked device 10 has associated with the tracked device 12. When the add-paired-device procedure fails, the second pairing application may configure the flag to indicate that the tracked device 10 has not yet associated with the tracked device 12, and return to step S212 for checking the pairing status.

The controller 162 of the pairing server 16 can keep on checking whether a pairing registration message from the tracked device 10 has been received (S222). If not, the controller 102 can return to Step S222 to check for the availability of the pairing registration message from the tracked device 10 again. If a pairing registration message from the tracked device 10 has been received by the IO interface 160, the controller 160 can compare the first IMSI of the tracked device 10 in the pairing request message and pairing registration message. When the first IMSI of the tracked device 10 in the pairing request message and pairing registration message match, the controller 160 can pair or associate the tracked device 10 and control device 12, and send a pairing response message to the control device 12 and tracked device 10, indicating the add-paired-devices procedure is successful (S224). Conversely, when the first IMSI of the tracked device 10 in the pairing request message and pairing registration message do not match, the controller 160 cannot pair or associate the tracked device 10 and control device 12, and send a pairing response message to the control device 12 and tracked device 10, indicating the add-paired-devices procedure fails (S224).

Subsequently, the transceiver 120 of the control device 12 can receive the pairing response message and the controller 102 of the control device 12 can determine whether the pairing is successfully registered based on the pairing response message (S202). If the pairing registration has failed, a display panel of the control device 12 can show the message "Try again", indicating that the pairing procedure has failed (S204). If the pairing registration has been successful, the display panel of the control device 12 can show the message "Success", indicating that the pairing procedure was successful (S206). The first pairing application is then completed and exited (S208).

Figure 3A:
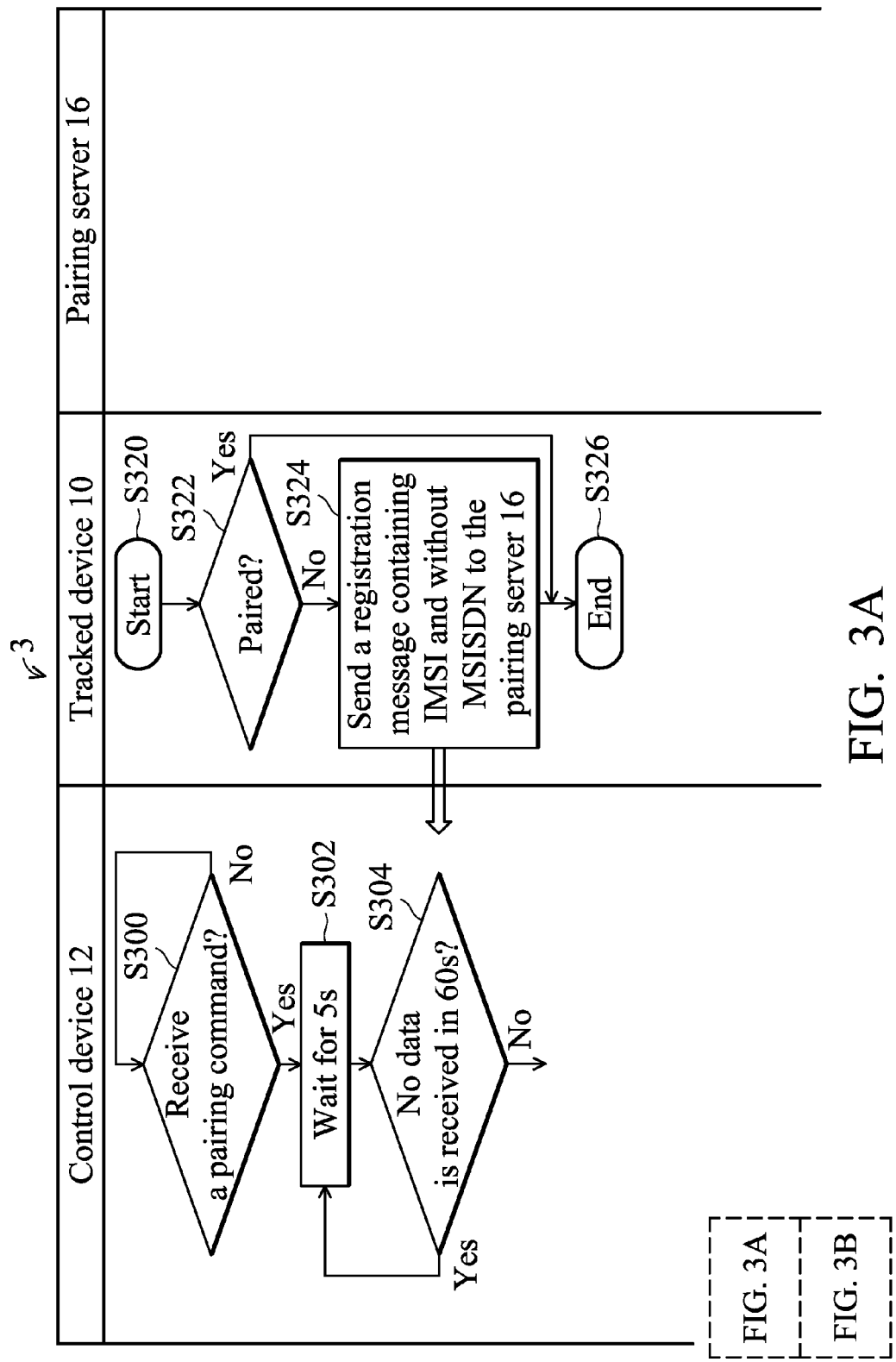
FIGS. 3A and 3B show a flowchart of a pairing method 3 according to another embodiment of the invention.
Figure 3B:
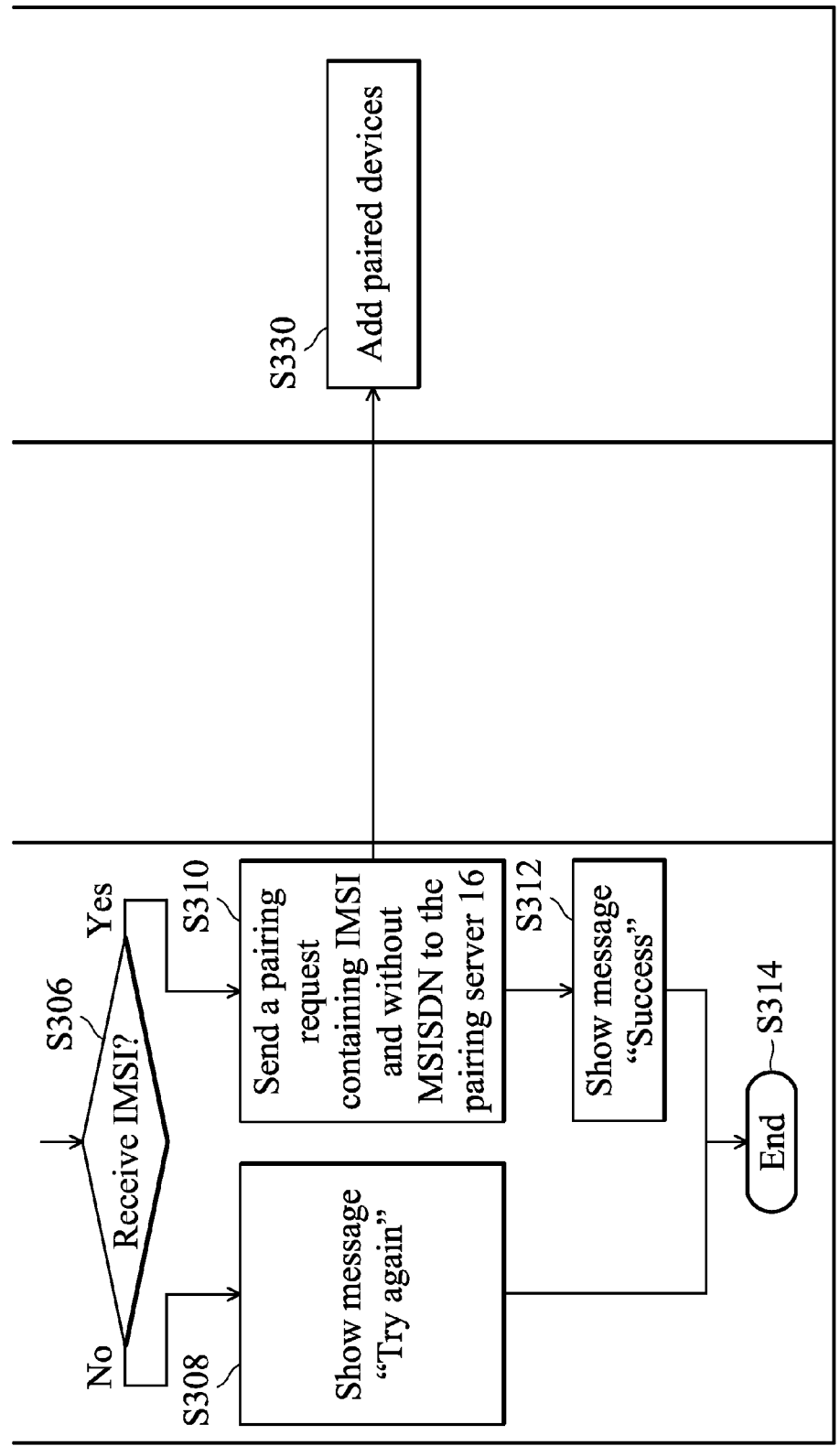

FIGS. 3A and 3B show a flowchart of a pairing method 3 according to another embodiment of the invention, incorporating the pairing system 1 in FIG. 1. The pairing method 3 may be implemented by program code executable by a controller, hardware circuits in a controller, or a combination thereof. The program code may be stored in a memory coupled to the controller. The pairing method 3 may be initiated before a location-based service, a home-automation service or a smart grid service.

Upon startup of the pairing method 3, the controller 122 of the control device 12 loads a first pairing application associated with the pairing method 3. The first pairing application may include an input interface to receive a pairing command entered by a user. The control device 12 can determine whether a pairing command has been entered into the input interface (S300). If not, the pairing method 3 goes back to Step S300 to carry on monitoring for a pairing command input. Upon receiving a pairing command, the control device 12 is configured to wait for a predetermined period of time, such as 60 seconds, to receive the IMSI and/or IMEI information from the tracked device 10.

Concurrently, the controller 102 of the tracked device 10 also loads a second pairing application including an input interface. A pairing command may be entered by a user into the tracked device 10 through the input interface. After the tracked device 10 is powered on or the second pairing application is initiated (S320), in response to the pairing command, the controller 102 can determine whether the tracked device 10 is paired or associated with another cellular device (S322). If the tracked device 10 has already paired or associated with another cellular device, the second pairing application may go to Step S326 and exit. If the tracked device 10 has not yet paired or associated with another cellular device, a pairing registration message can be transmitted by the transceiver 100 of the tracked device 10 to the control device 12 (S324). The pairing registration message includes the IMSI and/or IMEI and not the MSISDN of the tracked device 10. The tracked device may send the IMSI and/or IMEI information in the pairing registration message to the control device 12 by displaying a machine-readable label such as a QR code on a screen (not shown) of the tracked device 10, by wireless transmissions such as Bluetooth or Infrared, or by wired transmissions such as a USB cable. In some embodiments, the pairing request message includes only the IMSI of the tracked device 10 and the IMSI/IMEI of the control device 12. The pairing registration message may be transmitted through a wired connection, a wireless connection, or a combination thereof. After the pairing registration is sent, the second pairing application may be completed and exited (S326).

The controller 122 of the control device 12 may check whether the IMSI and/or IMEI information from the tracked device 10 has been received regularly, for example, every 5 seconds (S302). The control device 12 may receive the IMSI and/or IMEI information from the tracked device 10 by scanning a machine-readable label such as a QR code displayed on the tracked device 10, by wireless transmissions such as Bluetooth or Infrared, or by wired transmissions such as a USB cable. If the predetermined period of time has not expired and no data has been received, the control device 12 may keep on checking (S304). If the transceiver 120 of the control device 12 has received data from the tracked device 10 in the predetermined period of time, or no data has been received from the tracked device 10 for more than the predetermined period of time, the controller 122 than determines whether the IMSI and/or IMEI information of the tracked device 10 has been received (S306). When the IMSI and/or IMEI information of the tracked device 10 has not been received, the controller 122 is configured to show the message "Try again" on the display panel of the control device 12 (S308), indicating the pairing procedure fails, and exiting from the first pairing application (S314). When the IMSI and/or IMEI information of the tracked device 10 has been received, the transceiver 120 is configured to send a pairing request message to the pairing server 16 (S310), and the controller 122 is configured to show the message "Success" on the display panel of the control device 12 (S312), indicating that the pairing procedure was successful, and exiting from the first pairing application (S314). The pairing request message includes the IMSI and/or IMEI and not the MSISDN of the tracked device 10, and the IMSI and/or IMEI and not the MSISDN of the control device 12. In addition, the pairing request message may be transmitted through a wired connection, a wireless connection, or a combination thereof.

Once the pairing request is received by the IO interface 160 of the pairing server 16, the controller 162 of the pairing server 16 can initiate an add-paired-device procedure (S330). In the add-paired-device procedure, the controller 162 can check whether the received request message contains valid IMSI and/or IMEI of the tracked device 10 and valid IMSI and/or IMEI and not the MSISDN of the control device 12. If so, the controller 162 can pair or associate the IMSI and/or IMEI of the tracked device 10 with the IMSI and/or IMEI of the control device 12. For example, the controller 162 may associate the IMEI of the control device 12 with the IMSI of the tracked device 10 to allow the control device 12 to track, trace, or control activities of the tracked device 10. If the received request message contains invalid IMSI and/or IMEI of the tracked device 10 or invalid IMSI and/or IMEI and not the MSISDN of the control device 12, the controller 162 cannot pair or associate the tracked device 10 with the control device 12. The IO interface 160 may further transmit a pairing response message to the control device 12 and tracked device 10, indicating the result of the add-paired-devices procedure being successful or failed.

The pairing methods 2 and 3 employ the IMSIs and/or IMEIs to associate the control device 12 and the tracked device 10 together in a pairing service such as a location-based service or a home-automation service, without using the MSISDNs as in the conventional approach.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general-purpose processor, a digital signal processor (DSP), an application-specific integrated circuit (ASIC), a field programmable gate array signal (FPGA) or another programmable logic device, discrete gate or transistor logic, discrete hardware components or any combination thereof designed to perform the functions described herein. A general purpose processor may be a microprocessor, but in the alternative, the processor may be any commercially available processor, controller, micro controller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A pairing server, pairing a first cellular device with a second cellular device, comprising:
    an Input/output (IO) interface, configured to receive a second device identifier of the second cellular device and a first IMSI of the first cellular device; and
    a controller, configured to associate the first cellular device with the second cellular device after receiving the second device identifier of the second cellular device and a first IMSI of the first cellular device, wherein the IO interface is configured to receive a pairing request message containing the second device identifier and the first IMSI from the second cellular device and a pairing registration message containing only the first IMSI from the first cellular device; and
    when the first IMSIs in the pairing request message and the pairing registration message match each other, the controller is configured to associate the second device identifier with the first IMSI.

2. The pairing server of claim 1, wherein the IO interface is configured to receive a pairing request message containing the second device identifier from the second cellular device; and
    the controller is configured to associate the second device identifier with the first IMSI.

3. The pairing server of claim 1, wherein the second device identifier is a second IMEI of the second cellular device.

4. The pairing server of claim 1, wherein the IO interface is configured to transmit a pairing response which indicates a result of association of the first and second cellular devices to the second cellular device.

5. The pairing server of claim 1, wherein after the first cellular device is associated with the second cellular device, the controller is configured to track activity of the first cellular device, and report the activity of the first cellular device to the second cellular device.

6. The pairing server of claim 5, wherein the activity of the first cellular device relates to a location-based service.

7. The pairing server of claim 5, wherein the activity of the first cellular device relates to a home-automation service.

* * * * *